United States Patent [19]

Giles, Jr.

[11] 4,387,193

[45] Jun. 7, 1983

[54] BLENDS OF POLYETHERIMIDES AND ORGANOPOLYSILOXANE-POLYCARBONATE BLOCK COPOLYMERS

[75] Inventor: Harold F. Giles, Jr., Cheshire, Mass.

[73] Assignee: General Electric Company, Pittsfield, Mass.

[21] Appl. No.: 359,259

[22] Filed: Mar. 18, 1982

[51] Int. Cl.³ .................. C08L 79/08; C08L 83/10
[52] U.S. Cl. .................................. 525/431; 525/433
[58] Field of Search ............................. 525/431, 433

[56] References Cited

U.S. PATENT DOCUMENTS

| | | | |
|---|---|---|---|
| 3,779,990 | 12/1973 | Greber | 525/431 |
| 3,781,237 | 12/1973 | Alvine | 525/431 |
| 4,011,274 | 3/1977 | Berger | 525/433 |
| 4,225,687 | 9/1980 | de Torres | 525/433 |
| 4,258,155 | 3/1981 | Holub | 525/431 |

*Primary Examiner*—Paul Lieberman
*Attorney, Agent, or Firm*—Bernard, Rothwell & Brown

[57] ABSTRACT

Disclosed are blends of (a) a polyetherimide and (b) an organopolysiloxane - polycarbonate block copolymer. Such blends exhibit a good combination impact strength and flexural properties particularly at relatively high proportions of polyetherimide, and elastomeric behavior at relative high concentrations of the block copolymer of organopolysiloxane and polycarbonate.

8 Claims, No Drawings

BLENDS OF POLYETHERIMIDES AND ORGANOPOLYSILOXANE-POLYCARBONATE BLOCK COPOLYMERS

The present invention relates to a class of blends of a polyetherimide and a block copolymer of an organopolysiloxane and a polycarbonate. These blends exhibit a good combination of impact strength and flexural properties particularly at relatively high proportions of polyetherimide, and elastomeric behavior at relatively high concentrations of the block copolymer of organopolysiloxane and polycarbonate.

The blends of the invention include a polyetherimide of the formula:

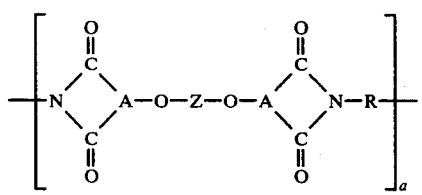

where a represents a whole number in excess of 1, e.g., 10 to 10,000 or more, the group —O—A< is selected from:

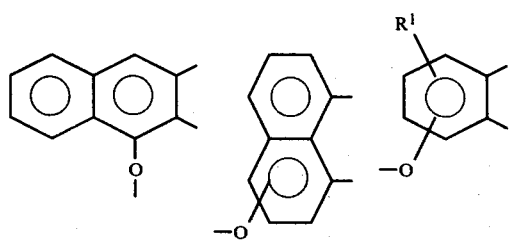

R' being hydrogen, lower alkyl or lower alkoxy, preferably the polyetherimide includes the latter —O—A< group where R' is hydrogen such that the polyetherimide is of the formula:

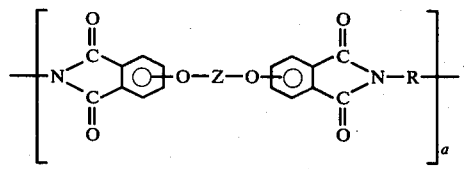

and the divalent bonds of the —O—Z—O— radical being in the 3,3'; 3,4'; 4,3' or the 4,4' position; Z is a member of the class consisting of (1)

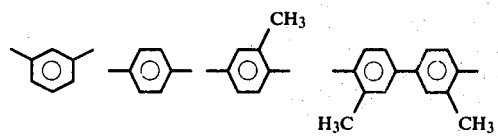

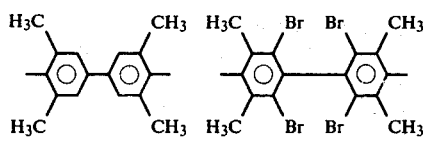

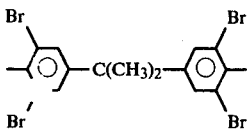

and (2) divalent organic radicals of the general formula:

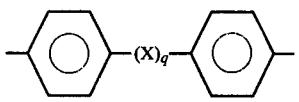

where X is a member selected from the class consisting of divalent radicals of the formulas, $$-C_yH_{2y}-,\ -\overset{O}{\underset{}{C}}-,\ -\overset{O}{\underset{O}{S}}-,\ -O-\ \text{and}\ -S-$$

where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

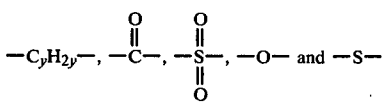

where Q is a member selected from the class consisting of $$-O-,\ -\overset{O}{\underset{}{C}}-,\ -\overset{O}{\underset{O}{S}}-,\ -S-\ \text{and}\ -C_xH_{2x}-$$

where x is a whole number from 1 to 5 inclusive. Particularly preferred polyetherimides for the purposes of the present invention include those where —O—A< and Z respectively are:

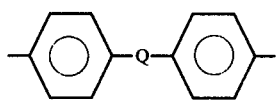

and R is selected from:

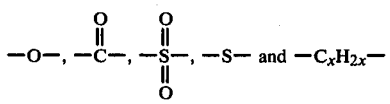

The polyetherimides where R is metaphenylene are most preferred.

Also included in the blends of the invention are organopolysiloxane-polycarbonate block copolymers which can be represented by the structural formula:

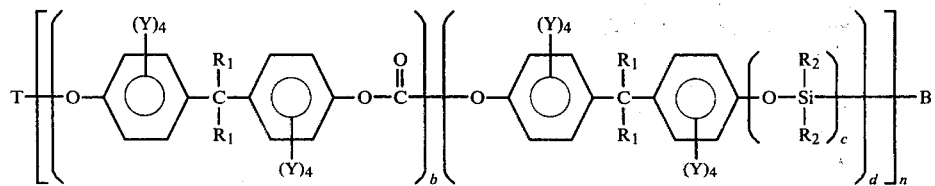

where n is at least 1, and preferably n is an integer equal to from 1 to about 1000, inclusive, b is equal to from 1 to about 200, inclusive, c is equal to from about 5 to about 200, inclusive, and preferably c has an average value from about 15 to about 90, inclusive, while the ratio of b to c can vary from about 0.05 to about 3, inclusive, and when c has an average value of from about 15 to about 90, inclusive, the ratio of b to c is preferably from about 0.067 to about 0.45, inclusive, d is 1 or more, u is an integer from 1 to 4 inclusive, B is

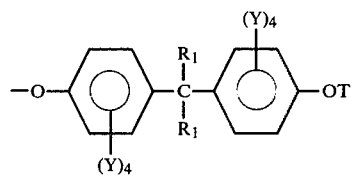

where T is member selected from hydrogen and

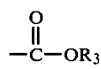

$R_1$ is a member selected from the class of hydrogen, monovalent hydrocarbon radicals and halogenated monovalent hydrocarbon radicals, $R_2$ is a member selected from the class of monovalent hydrocarbon radicals, halogenated monovalent hydrocarbon radicals and cyanoalkyl radicals, $R_3$ is a member selected from the class consisting of monovalent hydrocarbon radicals and halogenated hydrocarbon radicals, and Y is a member selected from the class consisting of hydrogen, lower alkyl radicals and halogen radicals and mixtures thereof.

Included within the radicals represented by $R_1$ are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; $R_1$ can be all the same radical or any two or more of the aforementioned radicals, and $R_1$ is preferably methyl, $R_2$ includes all radicals included by $R_1$ above except hydrogen, where $R_2$ also can be all the same radical or any two or more of the aforementioned $R_1$ radicals except hydrogen, and $R_2$ is preferably methyl. $R_2$ also includes, in addition to all the radicals included by $R_1$ except hydrogen, cyanoalkyl radicals such as cyanoethyl, cyanobutyl, etc., radicals. Radicals that are included within the definition of Y are hydrogen, methyl, ethyl, propyl, chloro, bromo, iodo, etc., and combinations thereof, and Y is preferably hydrogen.

The hydrolytically stable copolymers used in the blends of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from 10% to about 75% of said polydiorganosiloxane, and preferably from about 40 to 70% by weight. Copolymers of the above nature are described in U.S. Pat. No. 3,189,662, incorporated herein by reference, and can be used either alone as such or in conjunction with well known modifiers to provide particular desired characteristics to the blends.

The polyetherimides can be obtained by any of the methods well known to those skilled in the art including the reaction of any aromatic bis(ether anhydrides) of the formula

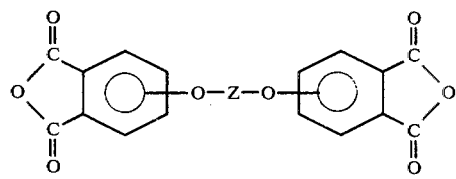

where Z is as defined hereinbefore with an organic diamine of the formula

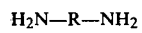

where R is as defined hereinbefore.

Aromatic bis(ether anhydride)s of the above formula include, for example, 2,2-bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; etc., 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2, 2-propane dianhydride; etc., and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. Also, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenyl propane, 4,4'-diaminodiphenyl methane, benzidine, 4,4'-diaminodiphenyl sulfide, 4,4'-diaminodiphenyl sulfone, 4,4'-diaminodiphenyl ether, 1,5-diaminoaphthalene, 3,3'-dimethylbenzidine, 3,3'-dimethoxybenzidine, 2,4-bis($\beta$-amino-t-butyl) toluene, bis(p-$\beta$-amino-t-butylphenyl)ether, bis(p-$\beta$-methyl-o-aminophenyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl) tetramethyldisiloxane, bis(4-aminobutyl)tetramethyldisiloxane, and the like.

In general, the reactions can be advantageously carried out employing well-known solvents, e.g., o-dichlorobenzene, m-cresol/toluene, etc., in which to effect interaction between the dianhydrides and the diamines, at temperatures of from about 100° to about 250° C. Alternatively, the polyetherimides can be prepared by melt polymerization of any of the aforementioned dianhydrides with any of the aforementioned diamine compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [$\eta$] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al., 3,847,867, Williams 3,847,869, Takekoshi et al. 3,850,885, White 3,852,242 and 3,855,178. These disclosures are incorporated herein in their entirety by reference for the purpose of teaching, by way of illustration, general and specific methods for preparing polyetherimides suitable for the blends of this invention.

The block copolymers of organopolysiloxane and polycarbonate can be produced by reacting at temperatures in the range of 0° C. to 100° C., preferably 20° C. to 50° C., and in the presence of an acid acceptor, a mixture of halogen chain-stopped polydiorganosiloxane having the formula

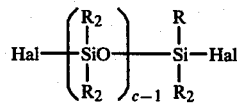

where Hal is a halogen radical, preferably chloro, and a dihydric phenol having the formula

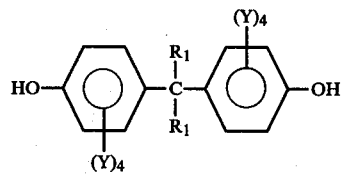

and thereafter phosgenating said reaction product until the resulting copolymer achieves a maximum intrinsic viscosity.

The halogen chain-stopped polydiorganosiloxanes can be made by conventional procedures such as by the controlled hydrolysis of a diorganodihalosilane, for example, dimethyldichlorosilane as taught in U.S. Pat. No. 2,381,366 to Patnode and U.S. Pat. Nos. 2,696,726 and 2,902,507 to Hyde.

Another procedure that can be employed involves equilibrating a mixture of a diorganodichlorosilane and a cyclic polydiorganosiloxane in the presence of a metal catalyst such as ferric chloride as shown in U.S. Pat. No. 2,421,653 to Sauer. Although the various procedures utilized in forming the halogen chain-stopped polysiloxane are not critical, generally it has been found desirable to maintain the halogen content of the resulting halogen chain-stopped polysiloxane in the range of about 0.4 to about 35%, by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in the above formula are, for example, 2,2-bis(4-hydroxyphenyl)-propane (bis-phenol-A); 2,4'-dihydroxydiphenylmethane; bis-(2-hydroxyphenyl)-methane; bis-(4-hydroxyphenyl)-methane; 1,1-bis(4-hydroxyphenyl)-ethane; 1,2-bis-(4-hydroxyphenyl)ethane; 1,1-bis-(4-hydroxy-2-chlorophenyl)-ethane; 1,1-bis(2,5-dimethyl-4-hydroxyphenyl)-ethane; 1,3-bis(3-methyl-4-hydroxyphenyl)-propane; 2,2-bis-(3-isopropyl-4-hydroxyphenyl)-propane, etc. Mixtures can also be used. Others will occur to those skilled in the art.

In accordance with the present invention, blends of a polyetherimide and a block copolymer of organopolysiloxane and polycarbonate are generally obtained in all proportions of the two polymers relative to each other. Consequently, blends comprising from about 1 to about 99% by weight, polyetherimide and from about 99 to about 1%, by weight, block copolymer are included within the scope of the invention. By controlling the proportions of polyetherimide and block copolymer relative to each other, blends having certain predetermined properties which may be improved over those of either the polyetherimide or the block copolymer alone are readily obtained. In general, blends of polyetherimides and the block copolymers preferably contain minor proportions of the block copolymer, e.g., from about 1.0% up to about 50%, by weight, so as to maintain the high strength characteristics of the polyetherimide component of the blend while improving the impact strength for the blend.

It is contemplated that the polyetherimide-block copolymer blends of the present invention may also include other additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more of the block copolymer or two or more of the block copolymers in combination with one or more polyetherimides.

Methods for forming polyetherimide-block copolymer blends vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to work loading at elevated temperatures for long periods of time. Films formed from the blends of this invention may be used in applications where films have been used previously. Thus, the blends of the present invention can be used in automobile and aviation application for decorative and protective purposes, and as high temperature electrical insulation for motor slot liners, transformers, dielectric capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Alternatively, solutions of the blends herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions may be formed from the polymer blends of the invention by incorporating such fillers as asbestos, glass fibers, talc, quartz, powder, finely divided carbon, and silica into the blends prior to molding. Shaped articles may be molded under heat, or under heat and pressure, in accordance with practices well-known in the art.

The following examples illustrate specific blends of a polyetherimide and a block copolymer of organopolysiloxane and polycarbonate in accordance with the present invention. It should be understood that the examples are given for the purpose of illustration and do not limit the invention. In the examples, all parts and percentages are by weight unless otherwise specified.

EXAMPLE I

A blend of a polyetherimide and a block copolymer of organopolysiloxane and polycarbonate according to the invention was prepared, the blend molded into test specimens and the specimens tested for various physical properties.

The polyetherimides of the blend were preformed from the reaction product of essentially equimolar amounts of 2,2-bis[4-(3,4-dicarboxyphenoxy)phenyl]-propane dianhydride and m-phenylenediamine produced at elevated temperature of. about 250° to about 300° C. and under a nitrogen atmosphere The polymer was extruded at about 300° C. to form a strand and mechanically chopped into pellets. The block copolymer of organopolysiloxane and polycarbonate used was a copolymer sold under the tradename LR resin by the General Electric Company.

About 90 parts of the above polyetherimide were mixed with about 10 parts of the block copolymer. The mixture of the two polymers was then extruded in a Werner & Pfleiderer extruder having a temperature profile varying from about 570° to 610° F. and having a die at about 590° F. The resulting extrudate was comminuted into pellets and the pellets injection molded into test specimens in a Battenfield molding machine at a temperature of about 610° F. The impact strength of these specimens was measured according to the unnotched and notched Izod impact test and the Gardner impact test and the results are set forth in the following Table. The flexural properties of the blend were also determined and are given in the table.

EXAMPLE II

The procedure of Example I was repeated with the exception that about 70 parts of polyetherimide were blended with about 30 parts of the copolymer to produce the blend according to the invention and the blend was molded at about 575° F. The results of the unnotched and notched Izod impact test, as well as Gardner impact strength, and flexural properties for the blend are detailed in the Table.

EXAMPLE III

The procedure of Example I was repeated with the exception that about 50 parts of polyetherimide was blended with about 50 parts of the copolymer to produce the blend according to the invention and the blend was molded at about 565° F. The results of the unnotched and notched Izod impact test, as well as the Gardner impact strength, and flexural properties for the blend are detailed in the Table.

EXAMPLE IV

The procedure of Example I was repeated with the exception that 30 parts of polyetherimide was blended with about 70 parts of the copolymer to produce the blend according to the invention and the blend was molded at 520°. The results of the unnotched and notched Izod impact test, as well as the Gardner impact strength, and flexural properties for the blend are detailed in the Table.

TABLE

| Example | Poly-etherimide (%) | Izod Impact[1] Strength (ft-lb/in) notched | Izod Impact[1] Strength (ft-lb/in) un-notched | Gardner Impact Strength (in - lbs) | Flexural Properties[2] Initial Modulus Psi × 10⁵ | Flexural Properties[2] Stress @ 5% Strain Psi × 10⁵ |
|---|---|---|---|---|---|---|
| I | 90 | 5.5 | 12.7 | 10.3 | 3.37 | 0.625 |
| II | 70 | 0.7 | 4.2 | 3.6 | 0.49 | 0.168 |
| III | 50 | 1.4 | 13.1 | 50.0 | 0.225 | 0.079 |
| IV | 30 | 6.2 | 9.5 | 31.0 | 0.199 | 0.075 |

[1]Tested according to ASTM method D256.
[2]Tested according to ASTM method D790.

As is apparent from the abovve test results, blends according to the invention exhibit a good combination of strength and flexural properties, particularly with a relatively high proportion of polyetherimide, and flexibility at relatively high concentrations of the block copolymer of organopolysiloxane and polycarbonate. In particular, the blend containing about 90% polyetherimide (the blend of Example I) has a relatively high notched Izod impact strength compared with the impact strength normally associated with the polyetherimide component alone.

Many other polyetherimides and block copolymers may be employed as set forth in the specification to obtain blends having characteristics similar to those set forth in the examples.

While the present invention has been described with reference to particular embodiments thereof, it will be understood that numerous modifications may be made by those skilled in the art without actually departing from the spirit and scope of the invention as defined in the appended claims.

I claim:

1. A composition comprising a blend proportion of (a) a polyetherimide and (b) a organopolysiloxane-polycarbonate copolymer.

2. A composition in accordance with claim 1 wherein the polyetherimide has the formula;

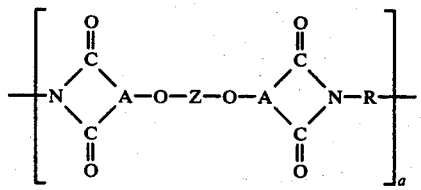

where a represents a whole number in excess of 1, the group —O—A< is selected from:

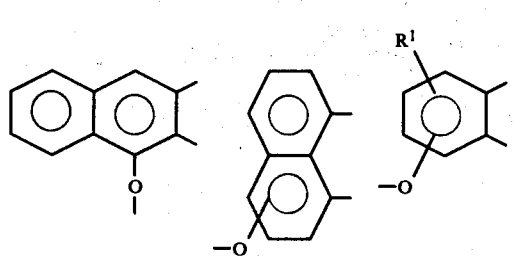

$R'$ being hydrogen, lower alkyl or lower alkoxy, Z is a member selected from the class consisting of (1)

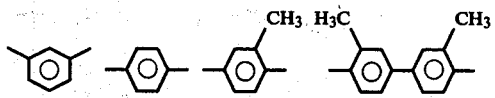

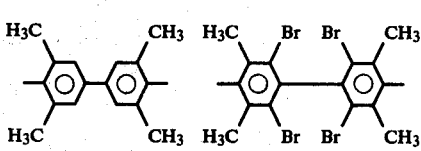

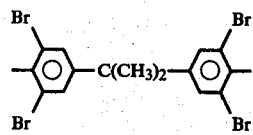

and (2) divalent organic radicals of the general formula:

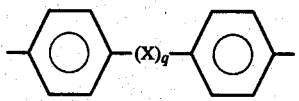

where X is a member selected from the class consisting of divalent radicals of the formulas,

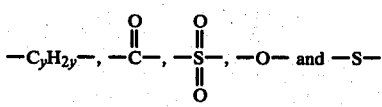

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

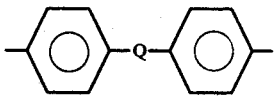

where Q is a member selected from the class consisting of

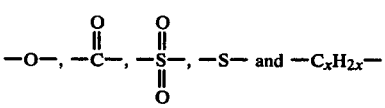

where x is a whole number from 1 to 5 inclusive.

3. A composition in accordance with claim 2 wherein the polyetherimide is of the formula;

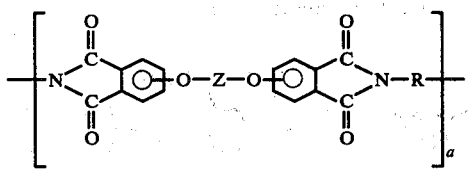

and the divalent bonds of the —O—Z—O— radical are in the 3,3'; 3,4'; 4,3' or the 4,4' position.

4. A composition in accordance with claim 3 wherein Z is;

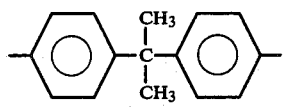

and R is selected from;

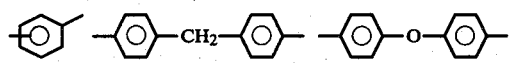

5. A composition in accordance with claim 4 wherein the polyetherimide is of the formula:

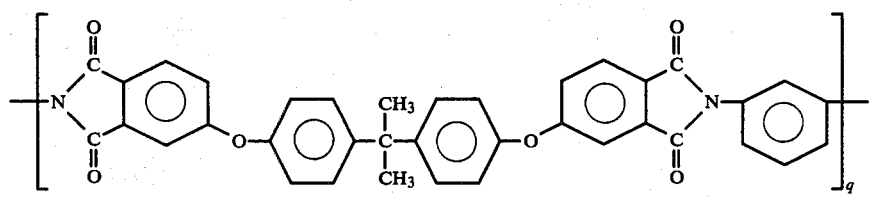

6. A composition in accordance with claims 1, 2, 3, 4, or 5 wherein the organopolysiloxane-polycarbonate copolymer is represented by the structural formula:

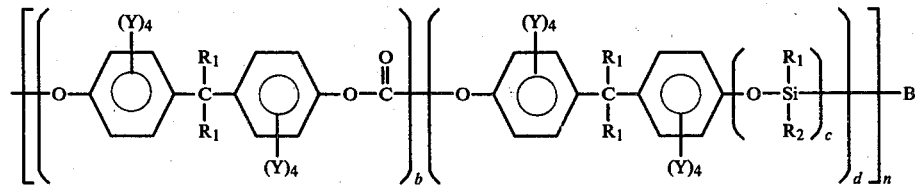

where n is at least 1, and preferably n is an integer equal to from 1 to about 1000, inclusive, b is equal to from 1 to about 200, inclusive, c is equal to from about 5 to about 200, inclusive, while the ratio of b to c can vary from about 0.05 to about 3, inclusive, d is 1 or more, u is an integer from 1 to 4 inclusive, B is

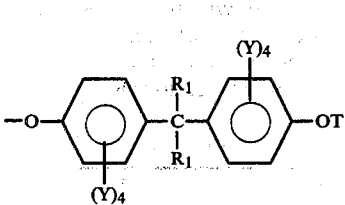

where T is a member selected from hydrogen and

$R_1$ is a member selected from the class of hydrogen, monovalent hydrocarbon radicals and halogenated monovalent hydrocarbon radicals, $R_2$ is a member selected from the class of monovalent hydrocarbon radicals, halogenated monovalent hydrocarbon radicals and cyanoalkyl radicals, $R_3$ is a member selected from the class consisting of monovalent hydrocarbon radicals and halogenated hydrocarbon radicals, and Y is a member selected from hydrogen, lower alkyl radicals and halogen radicals and mixtures thereof.

7. A composition in accordance with claim 6 wherein $R_1$ is selected from hydrogen, aryl radicals, halogenated aryl radicals, aralkyl radicals aliphatic, haloaliphatic and cycloaliphatic radicals; $R_2$ is selected from aryl radicals, halogenated aryl radicals; aralkyl radicals; aliphatic, haloaliphatic, cycloaliphatic radicals, and cyanoalkyl radicals. Y is selected from hydrogen, methyl, ethyl, propyl, chloro, bromo, iodo, and combinations thereof.

8. A composition in accordance with claim 7 wherein $R_1$ is selected from hydrogen, phenyl, chlorophenyl, xylyl, toyl, phenylethyl, benzyl, methyl, ethyl, propyl, chlorobutyl, and cyclohexyl, and $R_2$ is selected from phenyl, chlorophenyl, xylyl, toyl, phenylethyl, benzyl, methyl, ethyl, propyl, chlorobutyl, cyclohexyl, cyanoethyl and cyanobutyl.

* * * * *

UNITED STATES PATENT AND TRADEMARK OFFICE
CERTIFICATE OF CORRECTION

PATENT NO. : 4,387,193
DATED : June 7, 1983
INVENTOR(S) : Giles, Jr.

It is certified that error appears in the above-identified patent and that said Letters Patent is hereby corrected as shown below:

Column 9, line 19, "abovve" should read -- above --.

The five formulas in columns 3, 4, 6, 11 and 12 should be "$(Y)_u$" instead of "$(Y)_4$".

Signed and Sealed this

Twenty-seventh Day of September 1983

[SEAL]

Attest:

GERALD J. MOSSINGHOFF

*Attesting Officer*     *Commissioner of Patents and Trademarks*